United States Patent [19]

Hakala

[11] Patent Number: 5,163,172
[45] Date of Patent: Nov. 10, 1992

[54] PROCEDURE AND APPARATUS FOR THE MEASUREMENT OF THE CURRENTS IN A FREQUENCY CONVERTER

[75] Inventor: Harri Hakala, Hyvinkaa, Finland

[73] Assignee: Kone Elevator GmbH, Barr, Switzerland

[21] Appl. No.: 431,636

[22] Filed: Nov. 6, 1989

[30] Foreign Application Priority Data

Nov. 14, 1988 [FI] Finland .................. 885267

[51] Int. Cl.[5] .................. G01R 31/00; H02P 3/20
[52] U.S. Cl. .................. 324/111; 324/158 R; 324/158 MG; 318/762; 363/37
[58] Field of Search .............. 324/111, 158 MG, 78 J, 324/103 P, 158 R; 318/490, 807, 762; 322/99; 363/37; 361/24, 96

[56] References Cited

U.S. PATENT DOCUMENTS

| | | | |
|---|---|---|---|
| 3,732,405 | 5/1973 | Stewart | 324/78 J |
| 4,112,359 | 9/1978 | Hyer | 324/78 J |
| 4,314,189 | 2/1982 | Okado et al. | 363/37 |
| 4,422,040 | 12/1983 | Raider et al. | 324/158 MG |
| 4,527,214 | 7/1985 | Hattori et al. | 361/96 |
| 4,685,042 | 8/1987 | Severinsky | 363/37 |
| 4,697,131 | 9/1987 | Schauder et al. | 363/37 |
| 4,713,744 | 12/1987 | Coston | 318/807 |
| 4,788,485 | 11/1988 | Kawagishi et al. | 363/37 |

FOREIGN PATENT DOCUMENTS

| | | |
|---|---|---|
| 2095486A | 9/1982 | European Pat. Off. |
| 083326 | 7/1983 | European Pat. Off. |
| 87-07455 | 12/1987 | Finland. |
| 57-181236 | 11/1982 | Japan. |
| 63-001371 | 1/1988 | Japan. |
| 2132828A | 7/1984 | United Kingdom. |

OTHER PUBLICATIONS

"Transtronic Current Sensor"; Petersen 1985 p. 1.
"LEM Module"; Liaison Electroniques Mechaniques S.A. Geneve 1985, pp. 4-17.

Primary Examiner—Vinh Nugyen
Attorney, Agent, or Firm—Nixon & Vanderhye

[57] ABSTRACT

A procedure and apparatus for the measurement of the currents in a frequency converter, provides that the phase currents of the frequency converter are measured by storing, in memory, signals corresponding to the current of the d.c. circuit of the converter and by producing a current value corresponding to the phase current from the previous and the momentary signals.

16 Claims, 3 Drawing Sheets

PROCEDURE AND APPARATUS FOR THE MEASUREMENT OF THE CURRENTS IN A FREQUENCY CONVERTER

BACKGROUND OF THE INVENTION

1. Field of the Invention

The present invention relates to a procedure and an apparatus for the measurement of the currents in a frequency converter.

2. Description of Related Art

To protect the transistors in the inverter section of a frequency converter, a common solution in current practice is to provide each transistor or each phase with a separate protection arrangement. Such a solution is complex and expensive.

SUMMARY OF THE INVENTION

An object of the present invention is to eliminate the mentioned drawbacks of the prior art.

The procedure of the invention for a procedure for measuring phase current in a frequency converter having a d.c. circuit, comprises: storing, in memory, signals corresponding to the current of the d.c. circuit of the converter; and producing a current value corresponding to the phase current from a previously signal and a presently occurring signal.

In a preferred embodiment of the procedure according to the invention, the current value corresponding to the phase current is obtained by producing the difference between the two successively occurring signals mentioned.

In an apparatus for implementing the procedure of the invention for the measurement of the currents in a frequency converter, for the measurement of the phase currents of the frequency converter the apparatus is provided with a current sensor for producing the signals corresponding to the current in the d.c. circuit of the frequency converter, and with a measuring unit which is capable of storing the signals corresponding to the current in the d.c. circuit and of producing the current value corresponding to the phase current from the previous and the presently occurring signals.

A preferred embodiment of the apparatus for implementing the procedure of the invention provides that the measuring unit has a memory for the storage of the presently occurring and the previous signals, and a differential circuit for producing the value corresponding to the phase current as the difference between the two successive signals.

Another preferred embodiment of the apparatus for implementing the procedure of the invention provides that the memory consists of at least one peak detector.

A further preferred embodiment of the apparatus for implementing the procedure of the invention provides that the apparatus incorporates a comparator circuit for comparing the output signal of the differential circuit to a limit value.

Yet another preferred embodiment of the apparatus for implementing the procedure of the invention provides that the apparatus incorporates at least one comparator circuit for continuous current, allowing the signals corresponding to the current in the d.c. circuit to be compared to another limit value.

The present invention makes it possible to implement the measurement of the current as a single measuring operation in the intermediate d.c. circuit of the frequency converter, resulting in a low cost of the measuring apparatus. Furthermore, the electronic circuitry used for the measurement is simple and reliable in operation.

BRIEF DESCRIPTION OF THE DRAWINGS

The invention will now be described by way of example with reference to the drawings attached, wherein.

DESCRIPTION OF PREFERRED EMBODIMENTS

Figure 1:
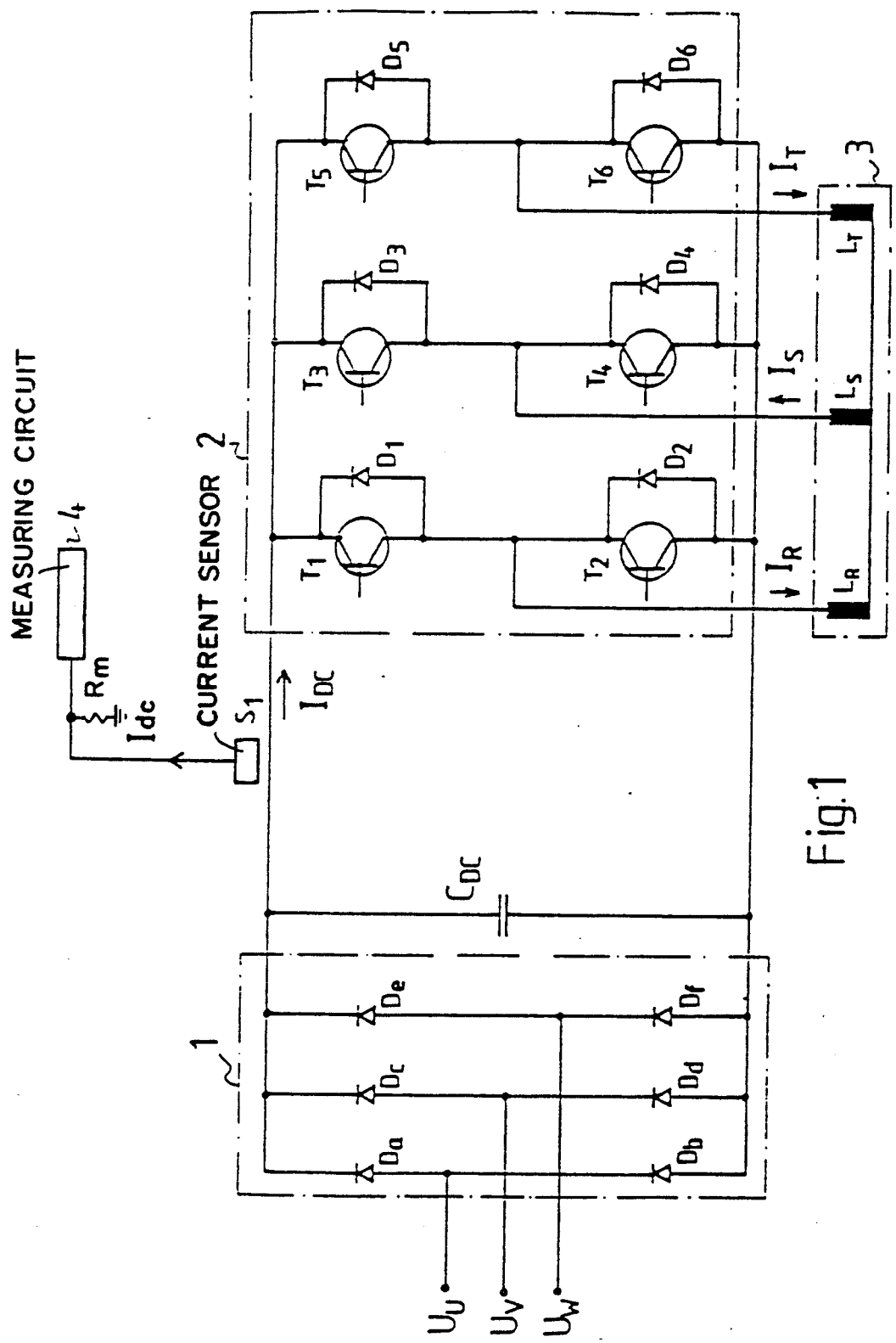
FIG. 1 illustrates the main current circuit of a three-phase frequency converter provided with a constant-voltage d.c. circuit.

Referring to FIG. 1, connected to the three-phases $U_U$, $U_V$ and $U_W$ of the mains network is a mains bridge 1, consisting of diodes $D_a$–$D_f$. The mains bridge 1 rectifies the a.c. mains voltage, producing a d.c. voltage for the d.c. circuit of the frequency converter. The d.c. circuit is provided with a smoothing capacitor $C_{DC}$ for smoothing the d.c. voltage. The d.c. voltage is converted into a variable-frequency a.c. voltage by a motor bridge 2, consisting of transistors $T_1$–$T_6$ and diodes $D_1$–$D_6$. The motor bridge feeds a three-phase motor 3, which has three windings $L_R$, $L_S$ and $L_T$, with currents $I_R$, $I_S$ and $I_T$ flowing through them. The method of the present invention comprises measuring the positive and negative variations of the current in the d.c. intermediate circuit of the frequency converter. These variations appear over the d.c. current whenever a transistor of the inverter bridge (T1–T6) is switched on or off by control pauses. As the switching of the inverter transistors occurs cyclically and in a definite order (for obtaining the desired shape and frequency of the phase currents $I_R$, $I_S$ and $I_T$), the transients in the d.c. circuit may be used for obtaining precise information about the phase currents.

Figure 2A:
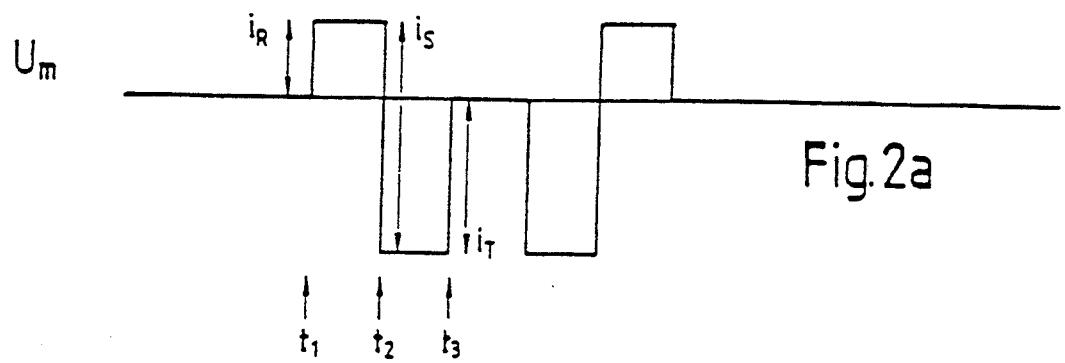
FIGS. 2a-2d illustrate the curve shapes of the voltages and currents involved in the present invention.

FIG. 2a represents the flow of the d.c. current $I_{DC}$ in the intermediate circuit during one switching cycle. The current sensor S1 outputs a signal $I_{dc}$ of the same form, which is converted by resistor $R_m$ (FIG. 3) into a corresponding measuring voltage $U_m$. The first commutation occurs at instant $t_1$ (FIG. 2a) as the current in the R-phase passes from diode $D_2$ to transistor $T_1$. This current can be measured directly as a value $i_R$ of the voltage $U_m$. However, when the next commutation from transistor $T_4$ to diode $D_3$ occurs at instant $t_2$, the direction of the current transient change in $I_{DC}$ in the intermediate circuit is reversed. Therefore, the value $I_s$ of the S-phase current cannot be read directly from the intermediate circuit current. Instead, it can be read as the difference $i_s$ between the two successive signals. Similarly, the third commutation occurs at instant $t_3$, and the current value $I_T$ for the T-phase is obtained as the difference $i_T$.

Figure 2B:
Figure 2C:
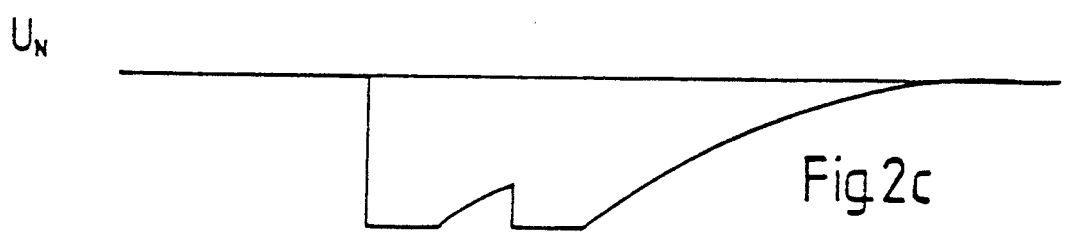
Figure 2D:
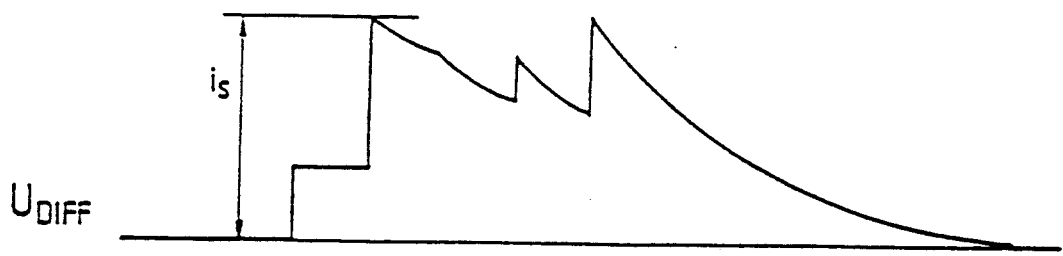
Figure 3:
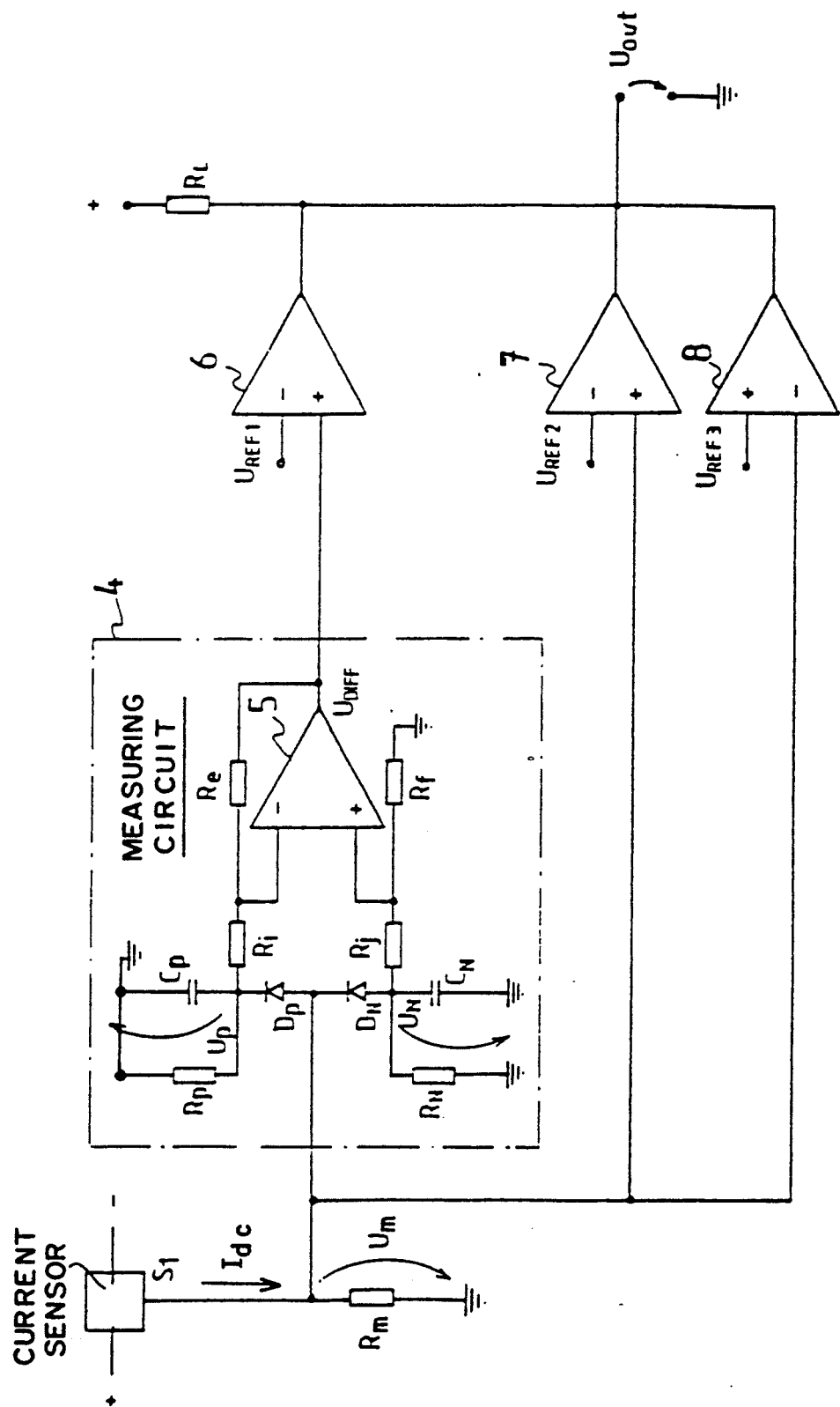
FIG. 3 illustrates the overcurrent protection circuit.

FIG. 3 shows a diagram of the overcurrent protection circuit, 4 by means of which the commutation at instant $t_2$ can be detected. The basic idea of the invention is that positive and negative transients in the d.c. current of the converter d.c. circuit are measured and alternately stored for a short period of time in a certain type of memory. In the embodiment of FIG. 3, capacitors $C_p$ and $C_n$ are used as memories for storing the transients measured in the d.c. current, as their relatively short time of storage is sufficient for their use as memories. The measurement signal is fed into two RCD-circuits acting as peak detectors in the measuring circuit 4, the first RCD-circuit consisting of resistor $R_p$, capacitor $C_P$ and diode $D_P$ and the second of resistor $R_N$, capacitor $C_N$ and diode $D_N$. The first circuit detects the positive peaks while the second one detects the negative peaks. Assuming zero threshold voltage for the diodes, we obtain the curves shown in FIGS. 2b and 2c, representing the voltages $U_p$ and $U_N$ across capacitors $C_p$ and $C_N$.

The difference between the output voltages of the peak detectors is obtained from a differential amplifier 5, whose negative input is fed via resistor $R_i$ by the voltage $U_p$ and the positive input via resistor $R_j$ by the voltage $U_N$. Feedback from the output to the negative input of the amplifier is provided by resistor $R_e$, while the positive input is connected to ground via resistor $R_f$. The output voltage of the amplifier reflects the magnitude of the current $i_s$ in the S-phase. In this case, the maximum phase current could not be determined simply by monitoring the amplitude of the current in the intermediate circuit.

Referring to FIG. 3, comparator 6 (e.g. of the conventional open collector output type) compares the output voltage $U_{diff}$ of the differential amplifier to set voltage $U_{ref1}$. When the current exceeds the allowed value, the output voltage $U_{out}$ goes down. Comparators 7 and 8 similarly detect the current value in the case of a continuous current flowing in the intermediate circuit. One comparator, 7, of the two comparators 7, 8 uses the limit $U_{ref2}$ and the other comparator, 8, uses $U_{ref3}$. The output is connected to the positive voltage + via pull up resistor $R_L$.

It is obvious to a person skilled in the art that different embodiments of the invention are not restricted to the examples described above, but that they may instead be varied within the scope of the following claims. In addition to overcurrent protection, the measurement principle described above can be used to other purposes as well. For example, it is possible to reconstruct the currents of all three phases and use the information in a control system. It is also possible to use the largest phase current to limit the voltage of the frequency converter.

I claim:

1. A method for measuring a phase current of a motor, controlled by a frequency converter having a rectifier bridge, a d.c. circuit and an inverter bridge, said method comprising the steps of:
   (a) measuring the current variations generated in the current of the d.c. circuit by the commutation of the inverter bridge;
   (b) continuously separating the successively occurring current variations measured in step (a), obtaining a previous and a present current value, and storing, in a memory said previous and said present current values, respectively,; and
   (c) processing said previous and said present current values and producing a phase current measurement signal corresponding to the phase current of said motor.

2. A method according to claim 1, wherein producing said phase current measurement signal is achieved by producing the difference between said previous and said present current values.

3. An apparatus for measuring a phase current in a frequency converter having a rectifier bridge, a d.c. circuit and an inverter bridge, said apparatus comprising:

a current sensor, measuring the current variations generated by the commutation of the inverter bridge, in the current of the d.c. circuit,; and a measuring unit, continuously separating a previous and a present current value from the measured current variations, and storing signals corresponding to said current values and producing a phase current measurement signal corresponding to said phase current.

4. An apparatus according to claim 3, wherein said measuring unit comprises:
   a memory for separate storage of said previous and said present current values; and
   a differential circuit for producing said phase current measurement signal as the difference between said previous and said present current values stored in said memory.

5. An apparatus according to claim 4, wherein said memory comprises at least one peak detector.

6. An apparatus according to claim 5 further comprising a first comparator circuit for comparing said phase current measurement signal output from said differential circuit to a first limit value.

7. An apparatus according to claim 6 further comprising at least one further comparator circuit, comparing the current variations measured in said current of the d.c. circuit to at least one further limit value.

8. An apparatus according to claim 5 further comprising at least one further comparator circuit, comparing the current variations measured in said current of the d.c. circuit to at least one further limit value.

9. An apparatus according to claim 1 further comprising a first comparator circuit for comparing said phase current measurement signal output from said differential circuit to a first limit value.

10. An apparatus according to claim 9 further comprising at least one further comparator circuit, comparing the current variations measured in said current of the d.c. circuit to at least one further limit value.

11. An apparatus according to claim 4 further comprising at least one further comparator circuit, comparing the current variations measured in said current of the d.c. circuit to at least one further limit value.

12. An apparatus according to claim 3 further comprising at least one further comparator circuit, comparing the current variations measured in said current of the d.c. circuit to at least one further limit value.

13. A method for measuring phase current output from a multiphase d.c. to a.c. inverter, said method comprising the steps of:
    measuring the d.c. current input to said inverter, including detecting and measuring variations in the input d.c. current occurring during different inverter phase output cycles; and
    generating a phase current measurement signal based on said measured d.c. current input to the inverter wherein said measuring step includes detecting and measuring a positive-going variation in input d.c. current during a first inverter output phase occurrence and a negative-going variation in input d.c. current during a second inverter output phase occurrence and wherein said generating step includes measuring the difference between said positive-going and negative-going variations.

14. A method as in claim 13 wherein said generating step includes comparing said measured difference with a predetermined reference value.

15. Apparatus for measuring phase current output from a multiphase d.c. to a.c. inverter, said apparatus comprising:

means for measuring the d.c. current input to said inverter, including means for detecting and measuring variations in the input d.c. current occurring during different inverter phase output cycles; and means for generating a phase current measurement signal based on said measured d.c. current input to the inverter, wherein said means for measuring includes means for detecting and measuring a positive-going variation in input d.c. current during a first inverter output phase occurrence and a negative-going variation in input d.c. current during a second inverter output phase occurrence and wherein said means for generating includes means for measuring the difference between said positive-going and negative-going variations.

16. Apparatus as in claim 14 wherein said means for generating includes means for comparing said measured difference with a predetermined reference value.

* * * * *